H. H. BOYER.
LAG.
APPLICATION FILED AUG. 4, 1911.
1,036,432.
Patented Aug. 20, 1912.
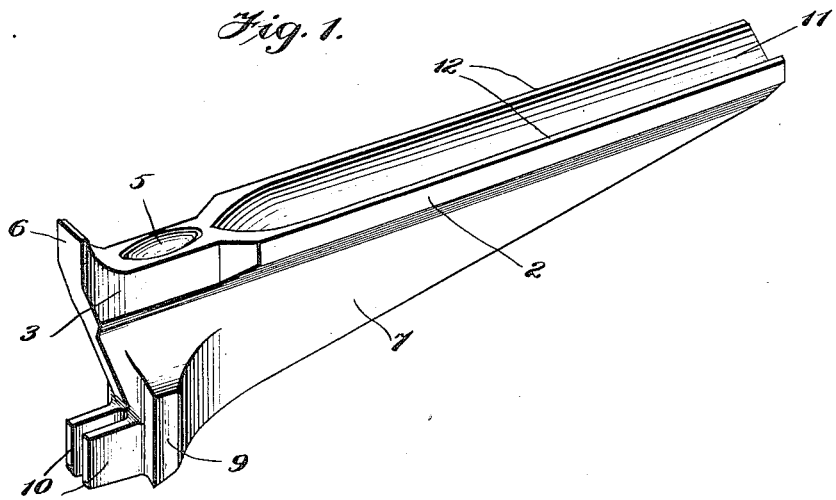
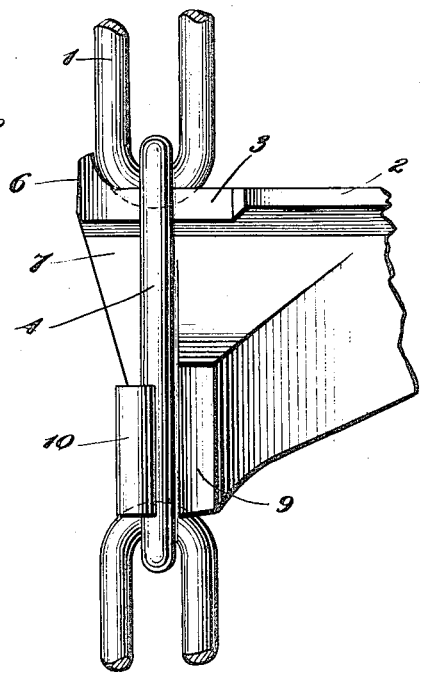
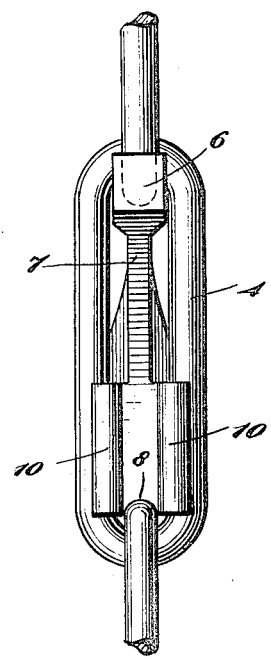
Witnesses
Inventor
H. H. Boyer,
By Wilkinson, Fisher & Witherspoon
his Attorneys

UNITED STATES PATENT OFFICE.

HERMAN H. BOYER, OF PENSACOLA, FLORIDA.

LAG.

1,036,432.  Specification of Letters Patent.  Patented Aug. 20, 1912.

Application filed August 4, 1911. Serial No. 642,362.

*To all whom it may concern:*

Be it known that I, HERMAN H. BOYER, a citizen of the United States, residing at Pensacola, in the county of Escambia and State of Florida, have invented certain new and useful Improvements in Lags; and I do hereby declare the following to be a full, clear, and exact description of the invention, such as will enable others skilled in the art to which it appertains to make and use the same.

This invention relates to improvements in lags, and is especially designed for connecting to a conveyer chain for dragging slabs, saw-dust and other refuse through a trough for clearing it away from a saw mill.

The object of the invention is to provide a simple practical lag which may be easily connected to the links of the chain in any suitably spaced relation without the use of bolts.

With the above and other objects in view the invention consists in certain combinations and arrangements of the parts hereinafter described, and the novel features thereof will be particularly pointed out in the appended claim.

The preferred embodiment of my invention is illustrated in the accompanying drawings in which like characters of reference indicate corresponding parts.

Figure 1 is a perspective view of a lag embodying my invention, Fig. 2 is a fragmental portion of the lag connected to a conveyer chain, and; Fig. 3 is a rear elevation of Fig. 2.

In the drawings 1 represents a conveyer chain to which is connected my improved lag, consisting of a flange 2 having a rear narrow portion 3 for passing through a link 4 of the conveyer chain, and said narrow portion is dished, as at 5, to provide a seat for the connecting link of the chain. Said narrow portion is provided with a projecting tongue 6 curved on its inner side for snugly abutting against the curved end portion of said connecting link.

Extending from the flange 2 is a longitudinally tapering rib 7, the rear under side of which is recessed, as at 8, for fitting the other connecting link of the conveyer chain, and from the sides of the rear portions of the rib project ears 9 forming shoulders for engaging the link 4, and projecting rearwardly from said ears are laterally spaced clips 10 arranged in alinement with the narrow portion 3 and adapted to pass through the lower portion of the link 4 and then doubled over to embrace the sides of the link 4, as shown in Figs. 2 and 3, for securing the lag to the conveyer chain. The front side of the flange 2 is preferably recessed as at 11 for forming the edges 12 to better engage the material being conveyed.

From the preceding description it will be readily understood that my improved lag is of simple construction, that same can be easily and quickly attached to a conveyer chain without the use of bolts, and that in the manner described it will be rigidly secured to the chain.

It is to be understood that slight changes in the form, proportion and minor details of construction may be resorted to without sacrificing any of the advantages or departing from the spirit of the invention.

Having fully described my invention what I claim is:—

In a conveyer chain lag, the combination of a flange having a rear narrow portion for passing through a chain link, the narrow portion being provided with a recess forming a seat for the connecting link of the conveyer chain and a tongue for engaging same, a longitudinal rib extending from the flange and provided at its rear under side with a recess for engaging the other connecting link of the conveyer chain, ears projecting laterally from said rib forming shoulders for engaging the sides of the first mentioned link, and clips projecting rearwardly from said ears adapted to pass through the first mentioned link of the conveyer chain and be doubled over to hold the ears in engagement with said link, substantially as described.

In testimony whereof, I affix my signature, in presence of two witnesses.

HERMAN H. BOYER.

Witnesses:
W. W. DAY,
T. J. JOHNSON.